(12) United States Patent
Nakagawa

(10) Patent No.: US 11,385,513 B2
(45) Date of Patent: Jul. 12, 2022

(54) LIQUID CRYSTAL DISPLAY DEVICE AND LIQUID CRYSTAL DISPLAY DEVICE MANUFACTURING METHOD

(71) Applicants: Panasonic Liquid Crystal Display Co., Ltd., Hyogo (JP); Pasona Knowledge Partner Inc., Osaka (JP)

(72) Inventor: Teruhisa Nakagawa, Hyogo (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 106 days.

(21) Appl. No.: 16/784,705

(22) Filed: Feb. 7, 2020

(65) Prior Publication Data
US 2020/0272009 A1    Aug. 27, 2020

(30) Foreign Application Priority Data
Feb. 26, 2019 (JP) .............................. JP2019-033393

(51) Int. Cl.
*G02F 1/1362* (2006.01)
*G02F 1/1368* (2006.01)
*G09G 3/36* (2006.01)

(52) U.S. Cl.
CPC ...... *G02F 1/136286* (2013.01); *G02F 1/1368* (2013.01); *G02F 2201/121* (2013.01); *G02F 2201/123* (2013.01); *G09G 3/3677* (2013.01); *G09G 3/3688* (2013.01); *G09G 2300/023* (2013.01); *G09G 2310/08* (2013.01)

(58) Field of Classification Search
None
See application file for complete search history.

(56) References Cited

U.S. PATENT DOCUMENTS

| | | | |
|---|---|---|---|
| 2001/0038427 | A1 | 11/2001 | Ueda et al. |
| 2009/0147186 | A1 | 6/2009 | Nakai et al. |
| 2009/0273743 | A1 | 11/2009 | Sawabe et al. |
| 2011/0261268 | A1 | 10/2011 | Nakai et al. |
| 2016/0252735 | A1 | 9/2016 | Zhang et al. |
| 2018/0217429 | A1† | 8/2018 | Busch |
| 2019/0146288 | A1* | 5/2019 | Kajita .............. G02F 1/136227 349/43 |

(Continued)

FOREIGN PATENT DOCUMENTS

| | | |
|---|---|---|
| JP | 10-268337 | 10/1998 |
| JP | 2001-282147 | 10/2001 |

(Continued)

*Primary Examiner* — Richard H Kim
(74) *Attorney, Agent, or Firm* — Wenderoth, Lind & Ponack, L.L.P.

(57) ABSTRACT

A liquid crystal display device comprising: a first liquid crystal display panel; and a second liquid crystal display panel opposed to the first liquid crystal display panel, wherein each of the first liquid crystal display panel and the second liquid crystal display panel includes a video signal line, a scanning line, a transistor provided in each pixel, and a pixel electrode provided in each pixel, and at least one of the video signal line, the scanning line, a semiconductor layer of the transistor, and the pixel electrode is patterned in an identical shape in the first liquid crystal display panel and the second liquid crystal display panel.

6 Claims, 10 Drawing Sheets

(56) References Cited

U.S. PATENT DOCUMENTS

2020/0135134 A1* 4/2020 Nakagawa ............ H01L 27/124

FOREIGN PATENT DOCUMENTS

| JP | 2006-113158 | 4/2006 |
|----|-------------|--------|
| JP | 2011-76107  | 4/2011 |
| JP | 2017-530428 | 10/2017 |
| WO | 2007/040158 | 4/2007 |

\* cited by examiner
† cited by third party

LIQUID CRYSTAL DISPLAY DEVICE AND LIQUID CRYSTAL DISPLAY DEVICE MANUFACTURING METHOD

CROSS-REFERENCE TO RELATED APPLICATION

This application claims priority from Japanese application JP 2019-033393, filed Feb. 26, 2019. This Japanese application is incorporated herein by reference.

BACKGROUND

1. Technical Field

The present disclosure relates to a liquid crystal display device and a liquid crystal display device manufacturing method.

2. Description of the Related Art

A liquid crystal display device using a liquid crystal display panel is used as displays of a television and a monitor. However, the liquid crystal display device has a contrast ratio lower than that of an organic electro luminescence (EL) display device.

For example, there has been proposed a liquid crystal display device capable of improving the contrast ratio by superimposing a first liquid crystal display panel displaying a color image and a second liquid crystal display panel displaying a monochrome image on each other (for example, see International Publication No. WO2007/040158).

CITATION LIST

Patent Literature

PTL 1: International Publication No. 2007/040158

SUMMARY

A transverse electric field system such as an in-plane switching (IPS) system and a fringe field switching (FFS) system is known as a liquid crystal display panel driving system.

For example, a transverse electric field system liquid crystal display panel includes a pixel electrode formed in each pixel and a common electrode opposed to the pixel electrode. The pixel electrode includes a plurality of line electrodes. Examples of the pixel electrode include a comb-shaped electrode and an electrode in which a plurality of slits are formed. Examples of the common electrode include one including a plurality of line electrodes in each pixel as in the pixel electrode, and one formed on a whole surface of the pixel region with the pixel electrode and an insulating film interposed therebetween.

In a liquid crystal display device in which two liquid crystal display panels having this configuration are superimposed on each other, sometimes one liquid crystal display panel and the other liquid crystal display panel are different from each other in an orientation of the line electrode of the pixel electrode. In this case, not only the pixel electrode but also other wirings such as a video signal line and a scanning line may be made different between one liquid crystal display panel and the other liquid crystal display panel according to a shape of the pixel electrode.

As described above, when manufacturing a liquid crystal display device including two liquid crystal display panels having different shapes of various electrodes and/or various wirings, twice as many masks as a single liquid crystal display panel are required in order to pattern the various electrodes and/or the various wirings in each liquid crystal display panel. That is, a mask that differs between the two liquid crystal display panels is required for each electrode and/or each wiring.

The present disclosure has been made to solve such a problem, and an object of the present disclosure is to provide a liquid crystal display device that does not require twice as many masks as a single liquid crystal display panel even if two liquid crystal display panels having different shapes of various electrodes and/or various wirings are used, and a method for manufacturing the liquid crystal display device.

To solve the above problem, a liquid crystal display device according to a present disclosure comprises: a first liquid crystal display panel; and a second liquid crystal display panel opposed to the first liquid crystal display panel, wherein each of the first liquid crystal display panel and the second liquid crystal display panel includes a video signal line, a scanning line, a transistor provided in each pixel, and a pixel electrode provided in each pixel, and at least one of the video signal line, the scanning line, a semiconductor layer of the transistor, and the pixel electrode is patterned in an identical shape in the first liquid crystal display panel and the second liquid crystal display panel.

The method for manufacturing a liquid crystal display device according to a present disclosure, the method for manufacturing a liquid crystal display device including a first liquid crystal display panel and a second liquid crystal display panel opposed to the first liquid crystal display panel, wherein each of the first liquid crystal display panel and the second liquid crystal display panel includes a video signal line, a scanning line, a transistor provided in each pixel, and a pixel electrode provided in each pixel, and at least one of the video signal line, the scanning line, a semiconductor layer of the transistor, and the pixel electrode is patterned using an identical mask in the first liquid crystal display panel and the second liquid crystal display panel.

The present disclosure can provide a liquid crystal display device that does not require twice as many masks as a single liquid crystal display panel even if two liquid crystal display panels having different shapes of various electrodes and/or various wirings are used, and a method for manufacturing the liquid crystal display device.

DETAILED DESCRIPTION

Figure 1:
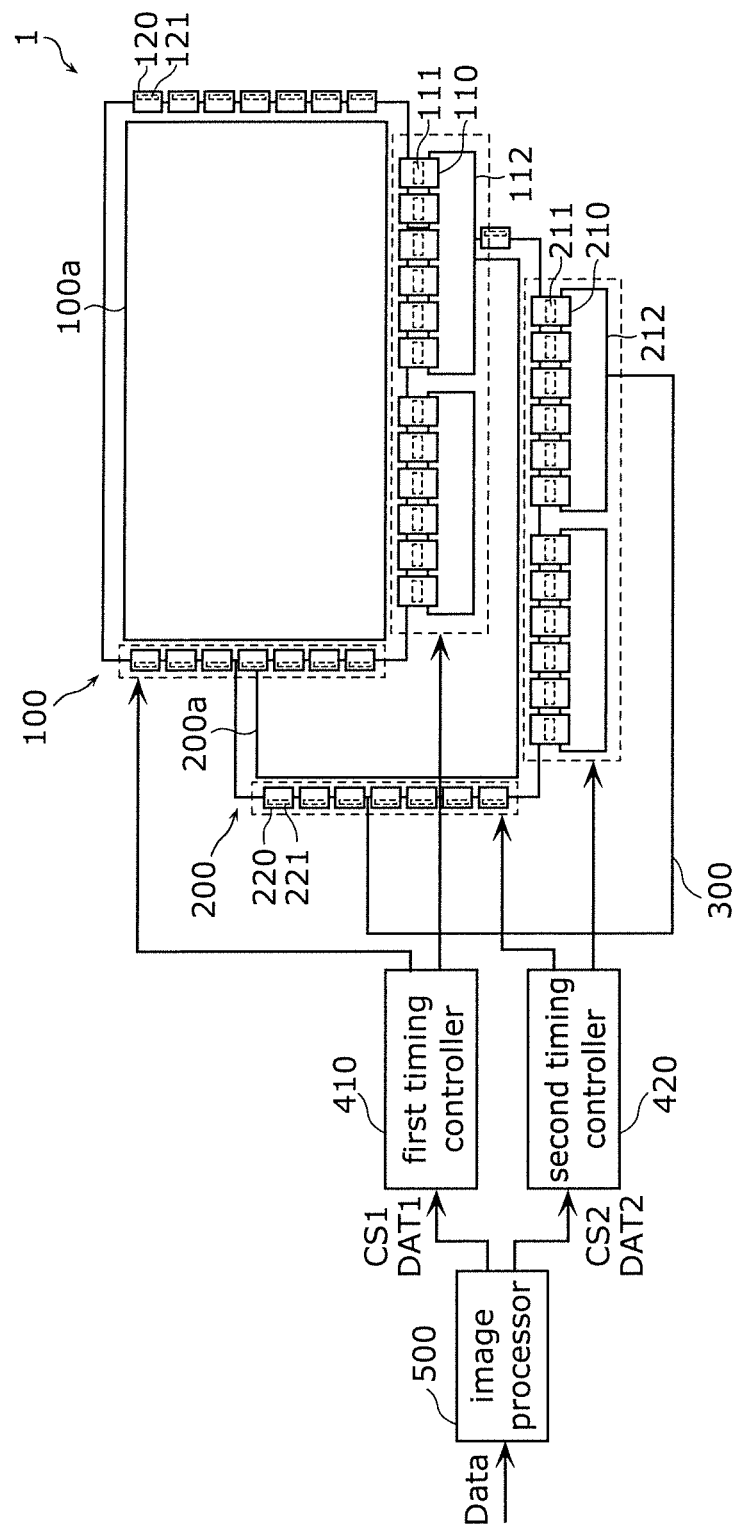
FIG. 1 is a view illustrating a schematic configuration of display device according to a first exemplary embodiment.

Hereinafter, exemplary embodiments of the present disclosure will be described. The following exemplary embodiments each illustrate a specific example of the present disclosure. Numerical values, constituent elements, arrangement positions and connection modes of the constituent elements, steps, and order of the steps illustrated in the following exemplary embodiments are examples, and therefore are not intended to limit the present disclosure. Among the constituent elements in the following exemplary embodiments, the constituent elements not described in independent claims indicating the broadest concept of the present disclosure are described as optional constituent elements.

The drawings are schematic diagrams, and not necessarily strictly illustrated. Thus, a scale and the like do not necessarily match in the drawings. In the drawings, substantially the same configurations are designated by the same reference numerals, and overlapping description will be omitted or simplified.

First Exemplary Embodiment

Figure 2:
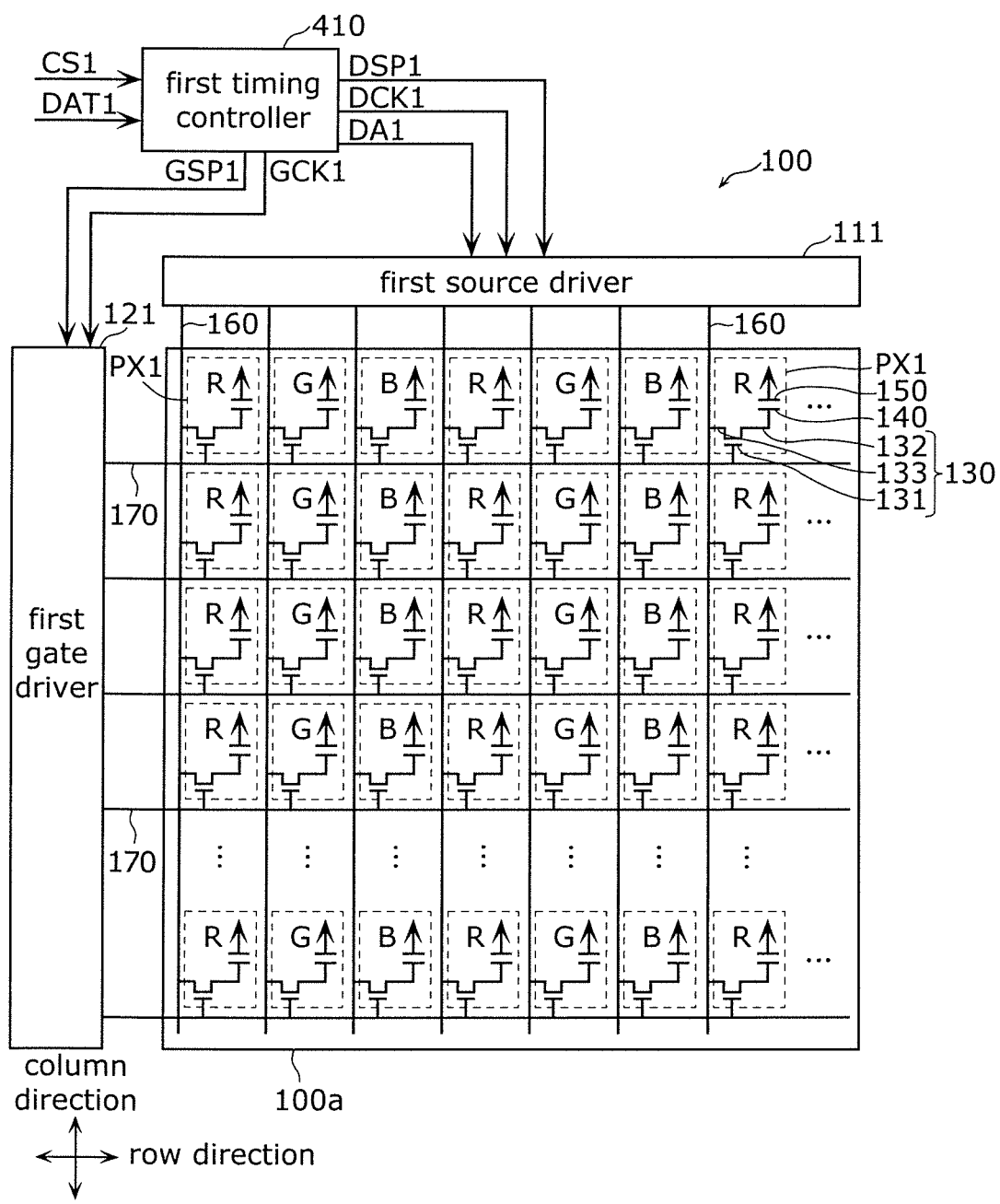
FIG. 2 is a view illustrating a schematic configuration of first liquid crystal display panel of liquid crystal display device according to a first exemplary embodiment.
Figure 3:
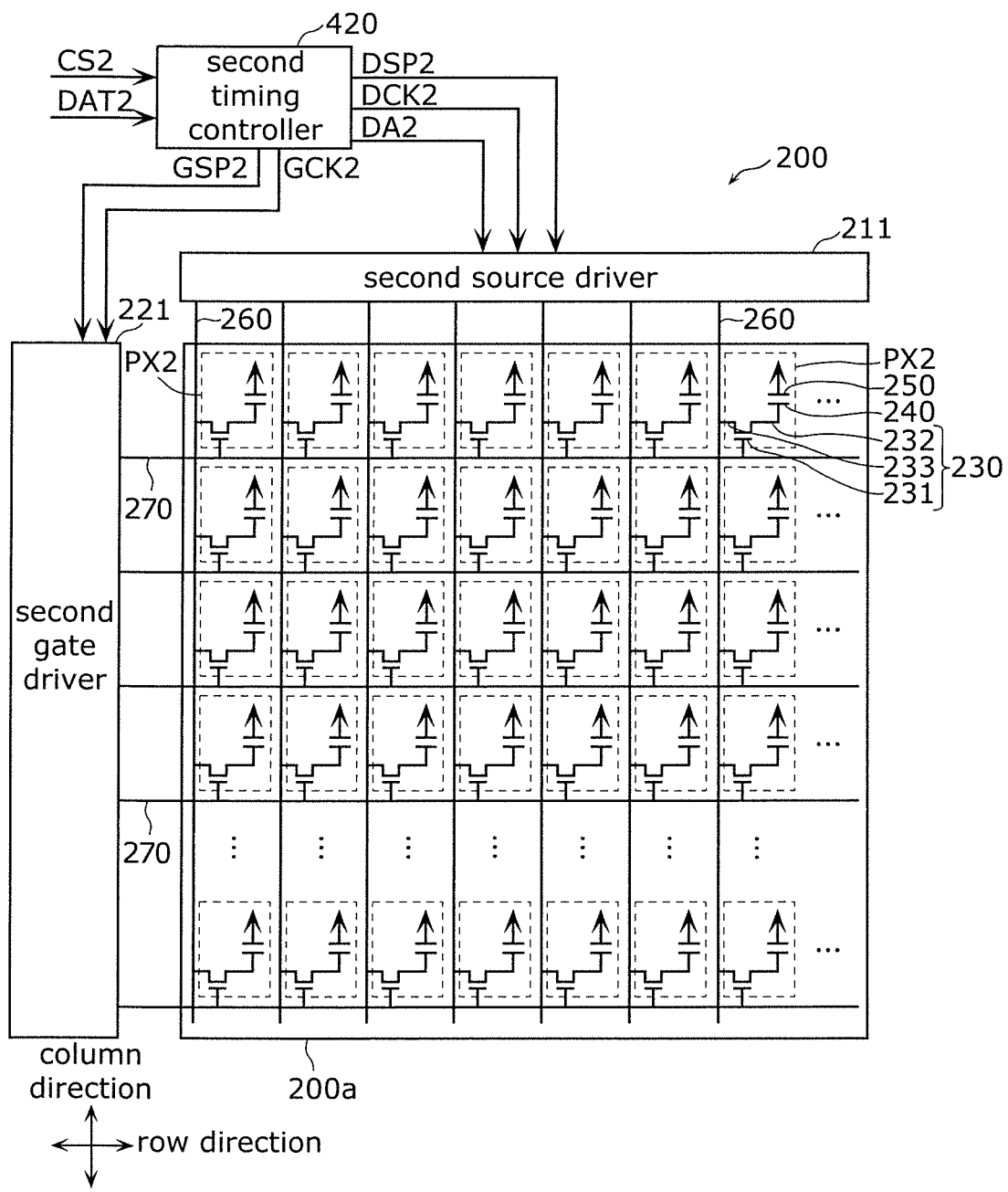
FIG. 3 is a view illustrating a schematic configuration of second liquid crystal display panel of liquid crystal display device according to a first exemplary embodiment.

Liquid crystal display device 1 according to a first exemplary embodiment will be described below with reference to FIGS. 1 to 3. FIG. 1 is a view illustrating a schematic configuration of liquid crystal display device 1 of the first exemplary embodiment. FIG. 2 is a view illustrating a schematic configuration of first liquid crystal display panel 100 of liquid crystal display device 1. FIG. 3 is a view illustrating a schematic configuration of second liquid crystal display panel 200 of liquid crystal display device 1.

Liquid crystal display device 1 is an image display device that displays a still image or an image of a moving image (video). As illustrated in FIG. 1, liquid crystal display device 1 includes first liquid crystal display panel 100 disposed at a position (front side) close to a viewer and second liquid crystal display panel 200 disposed at a position (rear side) farther from the viewer than first liquid crystal display panel 100. First liquid crystal display panel 100 and second liquid crystal display panel 200 have, but not limited to, an identical outer shape in planar view.

First liquid crystal display panel 100 is a main panel that displays an image visually recognized by a user. For example, first liquid crystal display panel 100 displays a color image as the image visually recognized by the user.

First source FPC 110 and first gate FPC 120 are connected to first liquid crystal display panel 100. First source FPC 110 and first gate FPC 120 are connected to electrode terminals of various signal lines of first liquid crystal display panel 100 by thermocompression bonding using, for example, an anisotropic conductive film (ACF).

First source FPC 110 is a flexible printed circuit (FPC) on which first source driver 111 is mounted. First source driver 111 is an integrated circuit (IC) driver (IC chip) in which an IC is packaged, and is mounted on first source FPC 110 by a chip on film (COF) technique.

First circuit board 112 is connected to a portion of first source FPC 110, the portion being one on an opposite side to first liquid crystal display panel 100. First circuit board 112 is electrically connected to first liquid crystal display panel 100 through first source FPC 110. First circuit board 112 is a printed circuit board (PCB) having a substantially rectangular plate shape, and a plurality of electronic components are mounted on first circuit board 112. First circuit board 112 has a function of transmitting various signals output from first timing controller 410 to first source driver 111 mounted on first source FPC 110.

First gate FPC 120 is a flexible printed circuit on which first gate driver 121 is mounted. First gate driver 121 is an IC driver (IC chip), and is mounted on first gate FPC 120 by a COF technique.

As described above, first source driver 111 and first gate driver 121 are mounted on first source FPC 110 and first gate FPC 120, respectively, as a first driver IC that outputs a drive signal to first liquid crystal display panel 100.

When the color image is displayed in first image display region 100a of first liquid crystal display panel 100, various signals output from first timing controller 410 are input to first source driver 111 and first gate driver 121. Various signals are input to first source driver 111 through first circuit board 112.

On the other hand, second liquid crystal display panel 200 is a sub-panel disposed on a back surface side of first liquid crystal display panel 100. For example, second liquid crystal display panel 200 displays a monochrome image (black-and-white image) of an image pattern corresponding to the color image displayed on first liquid crystal display panel 100 in synchronization with the color image.

Second source FPC 210 and second gate FPC 220 are connected to second liquid crystal display panel 200. Second source FPC 210 and second gate FPC 220 are connected to electrode terminals of various signal lines of second liquid crystal display panel 200 by thermocompression bonding using, for example, an anisotropic conductive film.

Second source FPC 210 is a flexible printed circuit on which second source driver 211 is mounted. Second source driver 211 is an IC driver (IC chip), and is mounted on second source FPC 210 by a COF technique.

Second circuit board 212 is connected to a portion of second source FPC 210, the portion being one on the opposite side to second liquid crystal display panel 200. Second circuit board 212 is electrically connected to second liquid crystal display panel 200 through second source FPC 210. Second circuit board 212 is a printed circuit board (PCB) having a substantially rectangular plate shape, and a plurality of electronic components are mounted on second circuit board 212. Second circuit board 212 has a function of transmitting various signals output from second timing controller 420 to second source driver 211 of second source FPC 210.

Second gate FPC 220 is a flexible printed circuit on which second gate driver 221 is mounted. Second gate driver 221 is an IC driver (IC chip), and is mounted on second gate FPC 220 by a COF technique.

As described above, second source driver 211 and second gate driver 221 are mounted on second source FPC 210 and second gate FPC 220, respectively, as a second driver IC that outputs a drive signal to second liquid crystal display panel 200.

When the monochrome image is displayed in second image display region 200a of second liquid crystal display panel 200, various signals output from second timing controller 420 are input to second source driver 211 and second gate driver 221. Various signals are input to second source driver 211 through second circuit board 212.

As illustrated in FIGS. 1 and 2, first liquid crystal display panel 100 includes first image display region 100a in which the image is displayed. As illustrated in FIG. 2, first image display region 100a is constructed with a plurality of pixels PX1 arranged in a matrix form. Because the color image is displayed on first liquid crystal display panel 100, each of the plurality of pixels PX1 is one of a red pixel (R), a green pixel (G), and a blue pixel (B). As an example, a set of three pixels consisting of the red pixel, the green pixel, and the blue pixel is repeatedly arranged along a row direction.

As illustrated in FIGS. 1 and 3, second liquid crystal display panel 200 has second image display region 200a in which the image is displayed. As illustrated in FIG. 3, second image display region 200a is constructed with a plurality of pixels PX2 arranged in a matrix form.

A number of pixels PX1 in first image display region 100a and a number of pixels PX2 in second image display region 200a may be equal to or different from each other, but the number of pixels PX1 of first image display region 100a in first liquid crystal display panel 100 that is the main panel is preferably larger than the number of pixels PX2 of second image display region 200a in second liquid crystal display panel 200 that is the sub-panel.

As illustrated in FIG. 2, in first liquid crystal display panel 100, transistor 130, pixel electrode 140, and common electrode 150 are provided in each of the plurality of pixels PX1. Transistor 130 is a thin film transistor, and includes gate electrode 131, source electrode 132, and drain electrode 133.

In the first exemplary embodiment, common electrode 150 is provided over the plurality of pixels PX1, and opposed to the plurality of pixel electrodes 140 with an insulating film interposed therebetween. Specifically, common electrode 150 is provided over all pixels PX1 in first image display region 100a. For example, common electrode 150 is one planar electrode common to all pixels PX1, and is formed over whole first image display region 100a.

First liquid crystal display panel 100 includes a plurality of video signal lines (data lines) 160 extending in a column direction and a plurality of scanning lines (gate lines) 170 extending in the row direction.

The plurality of video signal lines 160 are each provided at a boundary between two pixels PX1 adjacent to each other in the row direction. In the first exemplary embodiment, one video signal line 160 is provided for each boundary between two pixels PX1 adjacent to each other in the row direction.

Each video signal line 160 is connected to the plurality of transistors 130 of corresponding pixels PX1 arranged in the column direction. Specifically, each video signal line 160 is connected to drain electrodes 133 out of source electrodes 132 and drain electrodes 133 of corresponding transistors 130. That is, in the first exemplary embodiment, video signal line 160 is a drain line.

The plurality of scanning lines 170 are each provided at a boundary between two pixels PX1 adjacent to each other in the column direction. In the first exemplary embodiment, one scanning line 170 is provided for each boundary between two pixels PX1 adjacent to each other in the column direction.

Each scanning line 170 is connected to the plurality of transistors 130 of corresponding pixels PX1 arranged in the row direction. That is, each scanning line 170 is connected to the plurality of transistors 130 in respective pixels PX1. Specifically, each scanning line 170 is connected to gate electrodes 131 of respective transistors 130.

As illustrated in FIG. 3, in second liquid crystal display panel 200, transistor 230, pixel electrode 240, and common electrode 250 are provided in each of the plurality of pixels PX2. Transistor 230 is a thin film transistor, and includes gate electrode 231, source electrode 232, and drain electrode 233.

In the first exemplary embodiment, common electrode 250 is provided over the plurality of pixels PX2, and opposed to the plurality of pixel electrodes 240 with an insulating film interposed therebetween. Specifically, common electrode 250 is provided over all pixels PX2 in second image display region 200a. For example, common electrode 250 is one planar electrode common to all pixels PX2, and is formed over whole second image display region 200a.

Second liquid crystal display panel 200 includes a plurality of video signal lines 260 (data lines) extending in a column direction and a plurality of scanning lines (gate lines) 270 extending in the row direction.

The plurality of video signal lines 260 are each provided at a boundary between two pixels PX2 adjacent to each other in the row direction. In the first exemplary embodiment, one video signal line 260 is provided for each boundary between two pixels PX2 adjacent to each other in the row direction.

Each video signal line 260 is connected to the plurality of transistors 230 of corresponding pixels PX2 arranged in the column direction. Specifically, each video signal line 260 is connected to drain electrodes 233 out of source electrodes 232 and drain electrodes 233 of corresponding transistors 230. That is, in the first exemplary embodiment, video signal line 260 is a drain line.

The plurality of scanning lines 270 are each provided at a boundary between two pixels PX2 adjacent to each other in the column direction. In the first exemplary embodiment, one scanning line 270 is provided for each boundary between two pixels PX2 adjacent to each other in the column direction.

Each scanning line 270 is connected to the plurality of transistors 230 of corresponding pixels PX2 arranged in the row direction. That is, each scanning line 270 is connected to the plurality of transistors 230 in respective pixels PX2. Specifically, each scanning line 270 is connected to gate electrodes 231 of respective transistors 230.

For example, liquid crystal driving systems of first liquid crystal display panel 100 and second liquid crystal display panel 200 are a transverse electric field system such as an in plane switching (IPS) system or a fringe field switching (FFS) system. However, liquid crystal driving systems of first liquid crystal display panel 100 and second liquid crystal display panel 200 are not limited to the transverse electric field system. Voltage of first liquid crystal display panel 100 and second liquid crystal display panel 200 is controlled by a normally black system. The liquid crystal driving system of first liquid crystal display panel 100 and second liquid crystal display panel 200 is not limited to the transverse electric field system, but may be a vertical alignment (VA) system or a twisted nematic (TN) system. The voltage control system of first liquid crystal display panel 100 and second liquid crystal display panel 200 is not limited to the normally black system, but may be a normally white system.

As illustrated in FIG. 1, liquid crystal display device 1 further includes backlight 300. Backlight 300 is disposed behind second liquid crystal display panel 200.

Backlight 300 emits light toward first liquid crystal display panel 100 and second liquid crystal display panel 200. For example, backlight 300 is a light emitting diode (LED) backlight in which an LED is used as a light source. However, the light source of backlight 300 is not limited to the LED.

Liquid crystal display device 1 also includes first timing controller 410 that controls first source driver 111 and first gate driver 121 of first liquid crystal display panel 100, second timing controller 420 that controls second source driver 211 and second gate driver 221 of second liquid crystal display panel 200, and image processor 500 that outputs image data to first timing controller 410 and second timing controller 420.

As illustrated in FIG. 2, based on first image data DAT1 and first control signal CS1 (such as a clock signal, a vertical synchronizing signal, and a horizontal synchronizing signal), which are output from image processor 500, first timing controller 410 generates first image data signal DA1 and various timing signals (data start pulse DSP1, data clock DCK1, gate start pulse GSP1, and gate clock GCK1) used to control drive of first source driver 111 and first gate driver 121. First timing controller 410 outputs first image data signal DA1, data start pulse DSP1, and data clock DCK1 to first source driver 111, and outputs gate start pulse GSP1 and gate clock GCK1 to first gate driver 121.

First source driver 111 outputs a data voltage (data signal) corresponding to first image data signal DA1 to video signal line 160 of first liquid crystal display panel 100 based on data start pulse DSP1 and data clock DCK1. First gate driver 121 outputs a gate voltage (gate signal) to scanning line 170 of first liquid crystal display panel 100 based on gate start pulse GSP1 and gate clock GCK1. Consequently, the color image is displayed in first image display region 100a.

As illustrated in FIG. 3, based on second image data DAT2 and second control signal CS2 (a clock signal, a vertical synchronizing signal, and a horizontal synchronizing signal), which are output from image processor 500, second timing controller 420 generates second image data signal DA2 and various timing signals (data start pulse DSP2, data clock DCK2, gate start pulse GSP2, and gate clock GCK2) used to control drive of second source driver 211 and second gate driver 221. Second timing controller 420 outputs second image data signal DA2, data start pulse DSP2, and data clock DCK2 to second source driver 211, and outputs gate start pulse GSP2 and gate clock GCK2 to second gate driver 221.

Second source driver 211 outputs a data voltage (data signal) corresponding to second image data signal DA2 to video signal line 260 of second liquid crystal display panel 200 based on data start pulse DSP2 and data clock DCK2. Second gate driver 221 outputs a gate voltage (gate signal) to scanning line 270 of second liquid crystal display panel 200 based on gate start pulse GSP2 and gate clock GCK2.

As illustrated in FIG. 1, image processor 500 receives input video signal Data transmitted from an external system (not illustrated), performs predetermined image processing on input video signal Data, outputs first image data DAT1 to first timing controller 410, and outputs second image data DAT2 to second timing controller 420. First image data DAT1 is image data used to display the color image, and second image data DAT2 is image data used to display the monochrome image.

Image processor 500 outputs first control signal CS1 to first timing controller 410, and outputs second control signal CS2 to second timing controller 420. First control signal CS1 and second control signal CS2 include synchronizing signals synchronizing the color image displayed on first liquid crystal display panel 100 and the monochrome image displayed on second liquid crystal display panel 200.

In liquid crystal display device 1 of the first exemplary embodiment, the image is displayed while two display panels of first liquid crystal display panel 100 and second liquid crystal display panel 200 are superimposed on each other, so that black can be made distinct. Consequently, the image having a high contrast ratio can be displayed.

Specific structures of first liquid crystal display panel 100 and second liquid crystal display panel 200 will be described below.

Figure 4:
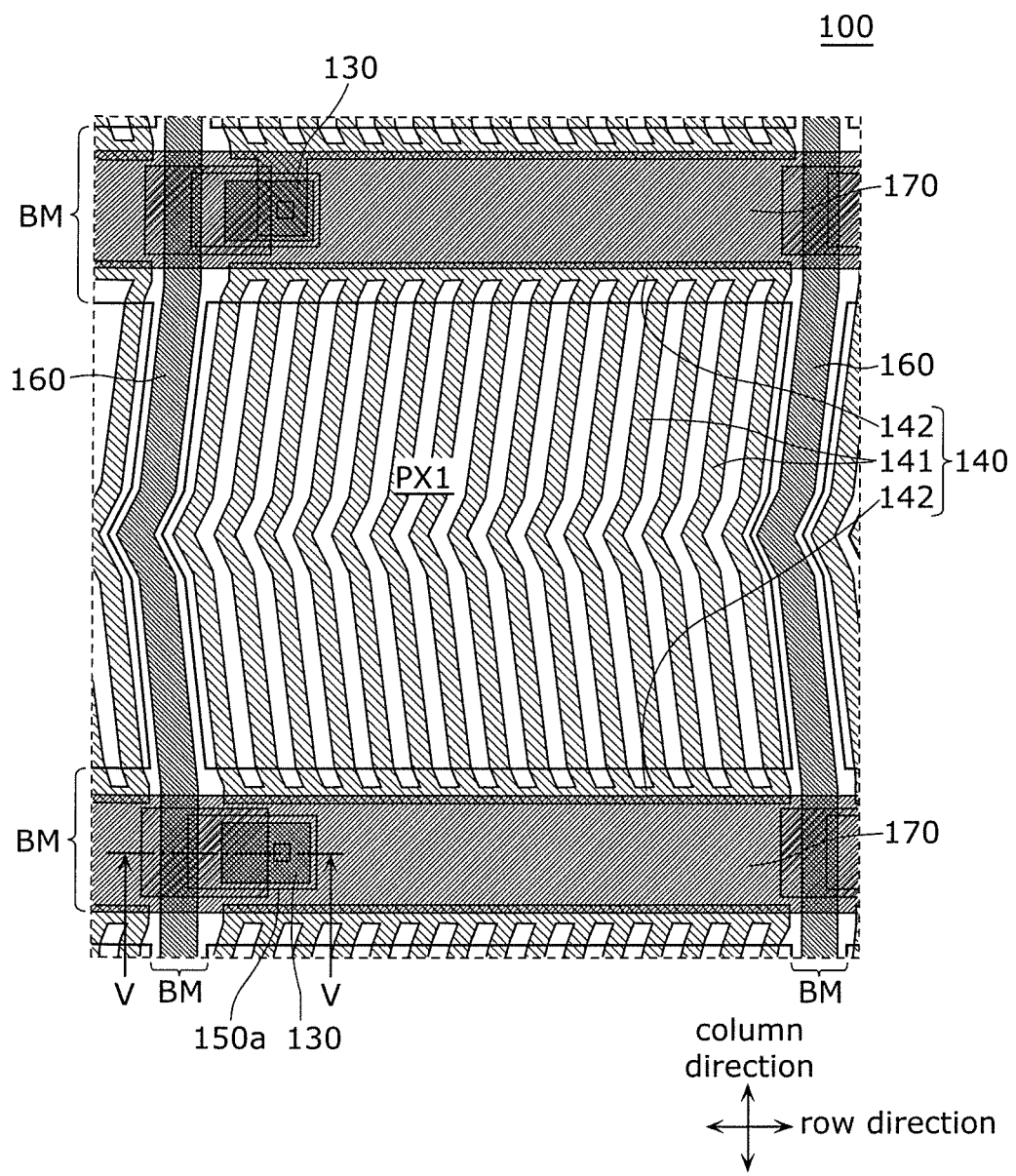
FIG. 4 is a plan view illustrating the layout of pixels of first liquid crystal display panel in liquid crystal display device according to the first exemplary embodiment.

A layout of pixels PX1 of first liquid crystal display panel 100 will be described with reference to FIGS. 2 and 4. FIG. 4 is a plan view illustrating the layout of pixels PX1 in first liquid crystal display panel 100 of the first exemplary embodiment.

As illustrated in FIG. 4, each of the plurality of video signal lines 160 extending in the column direction is partially bent into a chevron shape in each pixel PX1. In the first exemplary embodiment, the plurality of video signal lines 160 have the same width. The plurality of video signal lines 160 may be formed in a straight line without being partially bent.

Each of the plurality of scanning lines 170 extending in the row direction has a linear shape, and the plurality of scanning lines 170 are formed so as to be parallel to each other. In the first exemplary embodiment, the plurality of scanning lines 170 have the same width. The width of one scanning line 170 is larger than the width of one video signal line 160. Similarly to video signal line 160, the plurality of scanning lines 170 may be partially bent into the chevron shape.

Video signal line 160 and scanning line 170 are covered with black matrix BM. That is, upper portions of video signal line 160 and scanning line 170 constitute a non-opening. Black matrix BM is formed along the shapes of video signal line 160 and scanning line 170.

The liquid crystal driving system of first liquid crystal display panel 100 of the first exemplary embodiment is the transverse electric field system. Thus, in each pixel PX1, a plurality of slits are formed in pixel electrode 140, and pixel electrode 140 includes a plurality of line electrodes 141.

Both ends of the plurality of line electrodes 141 are coupled together by a pair of coupling electrodes 142. Specifically, in the plurality of line electrodes 141, one ends in a longitudinal direction are coupled together by coupling electrode 142 on one side, and the other ends in the longitudinal direction are coupled together by coupling electrode 142 on the other side.

The plurality of line electrodes 141 have substantially the same width, and are each formed in the substantial chevron shape including a bent portion in a central portion. Consequently, a multi-domain can be formed in pixel PX1, so that a color viewing angle characteristic can be improved. In each pixel electrode 140, an interval (slit width) between two line electrodes 141 adjacent to each other is uniform. In the first exemplary embodiment, a bent portion inclined deeper than the bent portion for the multi-domain is formed in the central portion of each line electrode 141 as a countermeasure against a push domain.

Transistors 130 formed at the intersections of video signal lines 160 and scanning lines 170 have the same shape, and are arrayed in a straight line along each of the row direction and the column direction.

A sectional structure of first liquid crystal display panel 100 will be described below with reference to FIG. 5. FIG.

5 is a sectional view of first liquid crystal display panel 100 taken along line V-V in FIG. 4.

Figure 5:
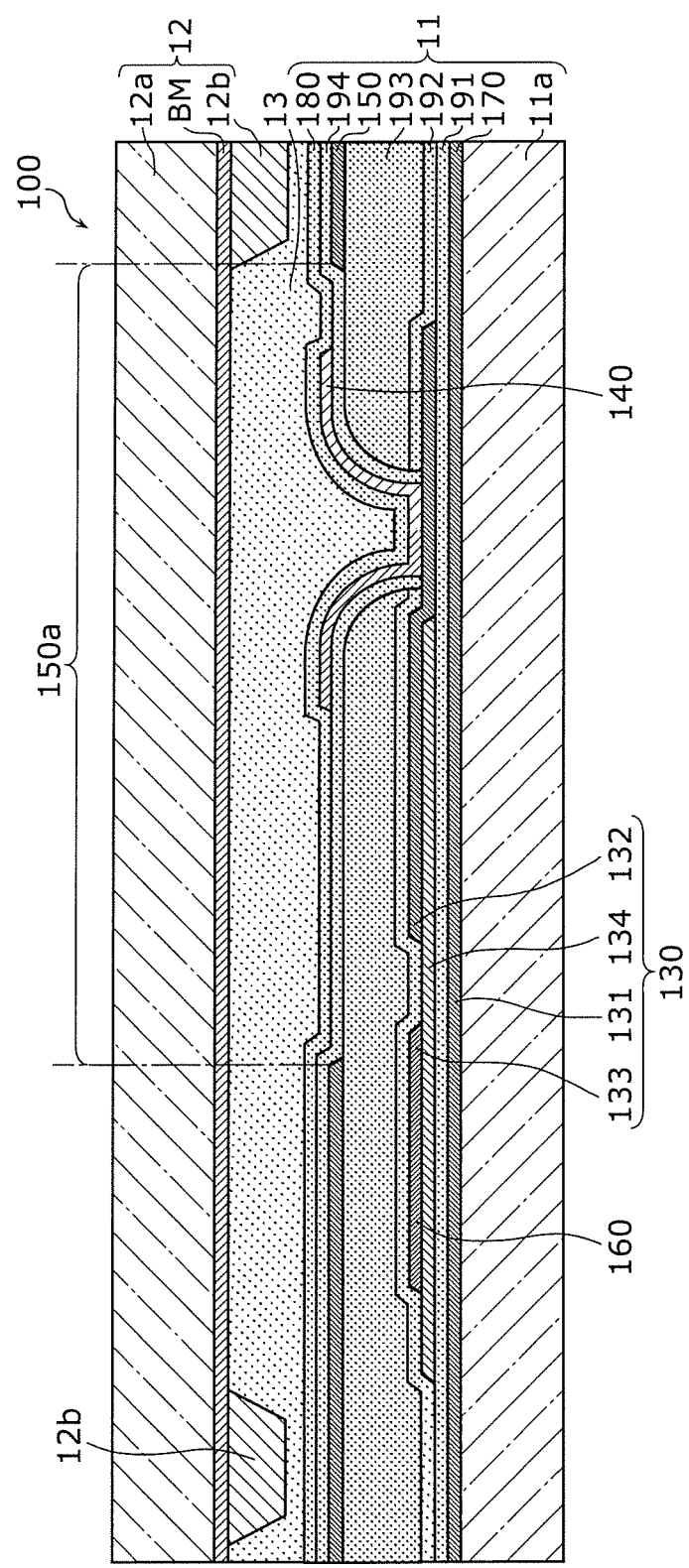
FIG. 5 is a sectional view of first liquid crystal display panel taken along line V-V in FIG. 4.

As illustrated in FIG. 5, first liquid crystal display panel 100 includes first substrate 11, second substrate 12 opposed to first substrate 11, and liquid crystal layer 13 disposed between first substrate 11 and second substrate 12. Although not illustrated, liquid crystal layer 13 is sealed between first substrate 11 and second substrate 12 using a frame-shaped sealing member.

First substrate 11 is a thin-film transistor (TFT) substrate including a TFT as transistor 130. Specifically, first substrate 11 is an active matrix substrate in which the plurality of transistors 130 are arranged in a matrix form. Various wirings such as video signal line 160 and scanning line 170, an interlayer insulating film that insulates these wirings from each other, pixel electrode 140, common electrode 150, and alignment film 180 are provided in first substrate 11 in addition to transistor 130. These are formed on first transparent base material 11a. For example, first transparent base material 11a is a transparent substrate such as a glass substrate.

Transistor 130 is formed on first transparent base material 11a. Transistor 130 includes gate electrode 131, source electrode 132, drain electrode 133, and semiconductor layer 134 constituting a channel layer. In the first exemplary embodiment, transistor 130 is a TFT having a bottom gate structure, and includes gate electrode 131 formed on first transparent base material 11a, first insulating film 191 that is the gate insulating film formed on gate electrode 131, and semiconductor layer 134 formed above gate electrode 131 with first insulating film 191 interposed therebetween. Source electrode 132 and drain electrode 133 are formed on semiconductor layer 134.

For example, gate electrode 131 may be made of a metal film having a two-layer structure of a molybdenum film and a copper film or a single-layer metal film of a copper film or the like. For example, first insulating film 191 may be made of an insulating film having a two-layer structure of a silicon oxide film and a silicon nitride film or a single-layer insulating film of a silicon oxide film or a silicon nitride film. For example, semiconductor layer 134 may be made of a semiconductor film having a two-layer structure of an i-amorphous silicon film and an n-amorphous silicon film or a single-layer semiconductor film. For example, source electrode 132 and drain electrode 133 may be made of a metal film having a two-layer structure of a molybdenum film and a copper film or a single-layer metal film of a copper film or the like.

The materials for gate electrode 131, source electrode 132, drain electrode 133, semiconductor layer 134, and first insulating film 191 are not limited thereto. For example, In—Ga—Zn—O-based oxide semiconductor may be used as the material for semiconductor layer 134.

As illustrated in FIG. 5, video signal line 160 and scanning line 170 are formed on first substrate 11. Video signal line 160, source electrode 132, and drain electrode 133 are formed in the same metal layer. That is, the same metal film is patterned by performing photolithography and etching using a mask, thereby forming video signal line 160, source electrode 132, and drain electrode 133. On the other hand, scanning line 170 and gate electrode 131 are formed in the same metal layer. That is, a metal film is patterned by performing photolithography and etching using a mask, thereby forming scanning line 170 and gate electrode 131.

As illustrated in FIG. 5, in the first exemplary embodiment, source electrode 132 of transistor 130 is connected to pixel electrode 140 through a contact hole. Drain electrode 133 of transistor 130 is connected to video signal line 160.

Second insulating film 192 is formed on first transparent base material 11a so as to cover transistor 130, video signal line 160, and scanning line 170. Second insulating film 192 is constructed with an inorganic insulating film made of an inorganic material such as a silicon nitride film. For example, second insulating film 192 that is the inorganic insulating film can be formed by a chemical vapor deposition (CVD) method.

Third insulating film 193 is formed so as to cover second insulating film 192. In the first exemplary embodiment, a thickness of third insulating film 193 is larger than a thickness of second insulating film 192. Specifically, the thickness of third insulating film 193 is greater than or equal to 4 times the thickness of second insulating film 192. For example, third insulating film 193 has a thickness of 3000 nm. With this, the distance in the thickness direction between the wiring such as video signal line 160 and scanning line 170 and common electrode 150 can be increased, so that a parasitic capacitance generated by the wiring such as video signal line 160 and scanning line 170 and common electrode 150 can be decreased. Irregularities caused by forming transistor 130, video signal line 160, and scanning line 170 of the TFT layer can be reduced by thickening third insulating film 193 to planarize the TFT layer. Consequently, third insulating film 193 in which the surface is planarized can be formed, so that common electrode 150 immediately above third insulating film 193 can be formed into a planar shape.

In the first exemplary embodiment, third insulating film 193 is constructed with an organic insulating film made of an organic material containing carbon. For example, third insulating film 193 that is the organic insulating film can be formed by applying and curing a liquid organic material. With this, third insulating film 193 can easily be thickened, so that the surface of third insulating film 193 can easily be planarized over all pixels PX1. That is, third insulating film 193 functions as a planarization layer.

Pixel electrode 140 and common electrode 150 are formed on first substrate 11. Specifically, pixel electrode 140 and common electrode 150 are laminated so as to be opposed each other with fourth insulating film 194 interposed therebetween.

In the first exemplary embodiment, common electrode 150 is formed on third insulating film 193. Fourth insulating film 194 is formed so as to cover common electrode 150, and pixel electrode 140 is formed into a predetermined shape on fourth insulating film 194. Pixel electrode 140 and common electrode 150 are a transparent electrode made of a transparent metal oxide such as indium tin oxide (ITO). Fourth insulating film 194 is made of an inorganic insulating film such as a silicon nitride film. For example, fourth insulating film 194 that is the inorganic insulating film can be formed by the CVD method.

Contact holes are appropriately made in first insulating film 191, second insulating film 192, third insulating film 193, and fourth insulating film 194 in order to connect conductive members such as electrodes or wirings of upper and lower layers. The contact hole is made by performing photolithography and etching using a mask. The contact hole may be made so as to pierce one or plural films of first insulating film 191, second insulating film 192, third insulating film 193, and fourth insulating film 194.

As described above, common electrode 150 is a planar solid electrode formed over all pixels PX1. Consequently, the wirings such as video signal line 160 and scanning line 170 are covered with common electrode 150, so that an electric field generated in the wirings such as video signal line 160 and scanning line 170 can be shielded by common electrode 150. That is, the electric field generated in the TFT layer can be shielded by common electrode 150. Thus, a freedom degree in designing the shape and size of pixel electrode 140 formed on common electrode 150 is improved, so that transmittance and an aperture ratio of pixel PX1 can easily be improved.

Common electrode 150 is a thin-film planar solid electrode, but as illustrated in FIGS. 4 and 5, opening 150a is formed in common electrode 150 above scanning line 170 in order to connect source electrode 132 of transistor 130 and pixel electrode 140. Thus, the contact hole piercing an insulating layer having a three-layer structure of second insulating film 192, third insulating film 193, and fourth insulating film 194 is made in opening 150a of common electrode 150. Thus, in each pixel PX1, source electrode 132 of transistor 130 and pixel electrode 140 are connected to each other through the contact hole.

Alignment film 180 is formed on pixel electrode 140. Alignment film 180 is formed over the whole surface of fourth insulating film 194 so as to cover pixel electrode 140. Alignment film 180 is in contact with liquid crystal layer 13, and controls initial alignment angles of liquid crystal molecules in liquid crystal layer 13. In the first exemplary embodiment, alignment film 180 is subjected to a rubbing treatment in order to align the initial alignment angles of the liquid crystal molecules in a certain direction.

Although not illustrated, a plurality of common lines made of a low-resistance material such as copper may be provided in contact with common electrode 150. For example, the common line is formed immediately above common electrode 150. The resistance of common electrode 150 can be decreased by providing the plurality of common lines. The plurality of common lines can be formed along the row direction or the column direction. In this case, because the common line made of a copper wire has a light shielding property, the common line is formed so as to overlap video signal line 160 or scanning line 170 covered with black matrix BM. As an example, the common line is formed along the column direction so as to overlap video signal line 160.

Second substrate 12 will be described below. Second substrate 12 is a counter substrate opposed to first substrate 11. Second substrate 12 includes second transparent base material 12a and black matrix BM formed on second transparent base material 12a. Similarly to first transparent base material 11a, second transparent base material 12a is a transparent substrate such as a glass substrate.

Black matrix BM is a black light shielding layer. For example, black matrix BM is made of carbon black. Black matrix BM is formed on the surface of second transparent base material 12a on the side of liquid crystal layer 13. A negative or positive photosensitive resin film is patterned by performing photolithography and etching using a mask, thereby forming black matrix BM. In the first exemplary embodiment, black matrix BM is formed in a lattice shape so as to cover video signal lines 160 and scanning lines 170. A width of black matrix BM is larger than the widths of video signal line 160 and scanning line 170.

In the first exemplary embodiment, because first liquid crystal display panel 100 displays the color image, second substrate 12 is a color filter substrate (CF substrate) having a color filter. In this case, the plurality of pixels PX1 are constructed with the red pixel, the green pixel, and the blue pixel, and a red color filter, a green color filter, and a blue color filter are provided for the red pixel, the green pixel, and the blue pixel, respectively. The color filter is formed in a region between black matrices BM (that is, an opening of black matrix BM). The color filter is formed by performing photolithography and etching using a mask.

Second substrate 12 has a plurality of spacers 12b. Spacer 12b is formed on second transparent base material 12a so as to protrude toward first substrate 11. Spacer 12b is a columnar member that maintains a fixed distance (cell gap) between first substrate 11 and second substrate 12. That is, the thickness of liquid crystal layer 13 can be fixed by spacer 12b. As an example, spacer 12b has a trapezoidal shape. Spacer 12b is made of a resin material such as an acrylic resin, and can elastically be deformed. For example, a resin film is patterned by performing photolithography and etching using a mask, thereby forming spacer 12b.

Two types of spacers of a main spacer and a sub-spacer may be used as spacer 12b. In this case, two masks are used when the main spacer and the sub-spacer are formed by a halftone mask. Spacer 12b is not necessarily provided.

A pair of polarizing plates (not illustrated) is bonded to first liquid crystal display panel 100 having the above configuration. For example, one of the pair of polarizing plates is formed on an outer surface of first substrate 11, and the other of the pair of polarizing plates is formed on an outer surface of second substrate 12. The pair of polarizing plates is disposed such that the polarization directions of the polarizing plates are orthogonal to each other. A phase difference plate may be bonded to the pair of polarizing plates.

Figure 6:
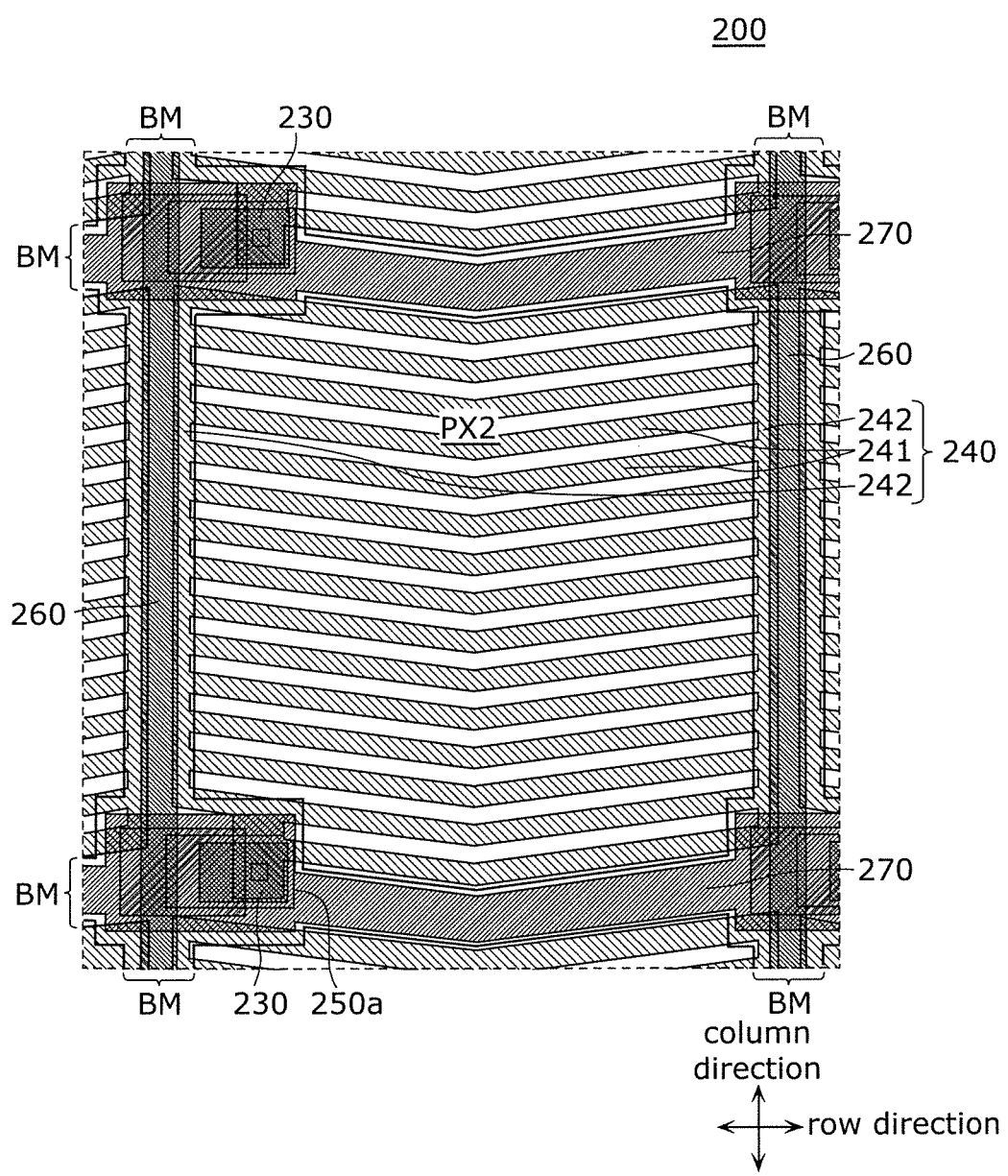
FIG. 6 is a plan view illustrating the layout of pixels of second liquid crystal display panel in liquid crystal display device according to the first exemplary embodiment.

A layout of pixels PX2 of second liquid crystal display panel 200 will be described with reference to FIGS. 3 and 6. FIG. 6 is a plan view illustrating the layout of pixels PX2 in second liquid crystal display panel 200 of the first exemplary embodiment.

As illustrated in FIG. 6, the plurality of video signal lines 260 extending in the column direction each have the linear shape, and are formed so as to be parallel to each other. Thus, the shape of video signal line 260 of second liquid crystal display panel 200 is different from the shape of video signal line 160 of first liquid crystal display panel 100. Similarly to video signal line 160 of first liquid crystal display panel 100, each of the plurality of video signal lines 260 may be partially bent into the chevron shape.

Each of the plurality of scanning lines 270 extending in the row direction is partially bent into a chevron shape in each pixel PX2. Thus, the shape of scanning line 270 of second liquid crystal display panel 200 is different from the shape of scanning line 170 of first liquid crystal display panel 100. In the first exemplary embodiment, the plurality of scanning lines 270 have the same width. The width of one scanning line 270 is larger than the width of one video signal line 160. Similarly to scanning lines 170 of first liquid crystal display panel 100, the plurality of scanning lines 270 may each have the linear shape, and be parallel to each other.

Video signal line 260 and scanning line 270 are covered with black matrix BM. That is, upper portions of video signal line 260 and scanning line 270 constitute a non-opening. Black matrix BM is formed along the shapes of video signal line 260 and scanning line 270.

The liquid crystal driving system of second liquid crystal display panel 200 of the first exemplary embodiment is the transverse electric field system. Thus, in each pixel PX2, the plurality of slits are formed in pixel electrode 240, and pixel electrode 240 includes a plurality of line electrodes 241.

Both ends of the plurality of line electrodes 241 are coupled together by a pair of coupling electrodes 242.

Specifically, in the plurality of line electrodes 241, one ends in a longitudinal direction are coupled together by coupling electrode 242 on one side, and the other ends in the longitudinal direction are coupled together by coupling electrode 242 on the other side.

The plurality of line electrodes 241 have substantially the same width, and are each formed in the substantial chevron shape including a bent portion in a central portion. Consequently, a multi-domain can be formed in pixel PX2, so that a color viewing angle characteristic can be improved. In each pixel electrode 240, an interval (slit width) between two line electrodes 241 adjacent to each other is uniform. In the first exemplary embodiment, a bent portion inclined deeper than the bent portion for the multi-domain is formed in the central portion of each line electrode 241 as the countermeasure against the push domain.

In the first exemplary embodiment, an extending direction of line electrode 241 in second liquid crystal display panel 200 is different from an extending direction of line electrode 141 in first liquid crystal display panel 100. For this reason, an extending direction of coupling electrode 242 in second liquid crystal display panel 200 is different from an extending direction of coupling electrode 142 in first liquid crystal display panel 100.

Specifically, line electrode 241 of second liquid crystal display panel 200 extends mainly along the row direction, whereas line electrode 141 of first liquid crystal display panel 100 extends mainly in the column direction. Coupling electrode 242 of second liquid crystal display panel 200 extends mainly along the column direction, whereas coupling electrode 142 of first liquid crystal display panel 100 extends mainly in the row direction.

Transistors 230 formed at the intersections of video signal lines 260 and scanning lines 270 have the same shape, and are arrayed in a straight line along each of the row direction and the column direction.

The sectional structure of second liquid crystal display panel 200 is the same as the sectional structure of first liquid crystal display panel 100 except that the color filter is not provided. That is, a color filter mask is not used in second liquid crystal display panel 200. As illustrated in FIG. 6, similarly to common electrode 150 of first liquid crystal display panel 100, opening 250a is formed in common electrode 250, which is a solid electrode, above scanning line 270 in order to connect source electrode 232 of transistor 230 and pixel electrode 240.

Figure 7:
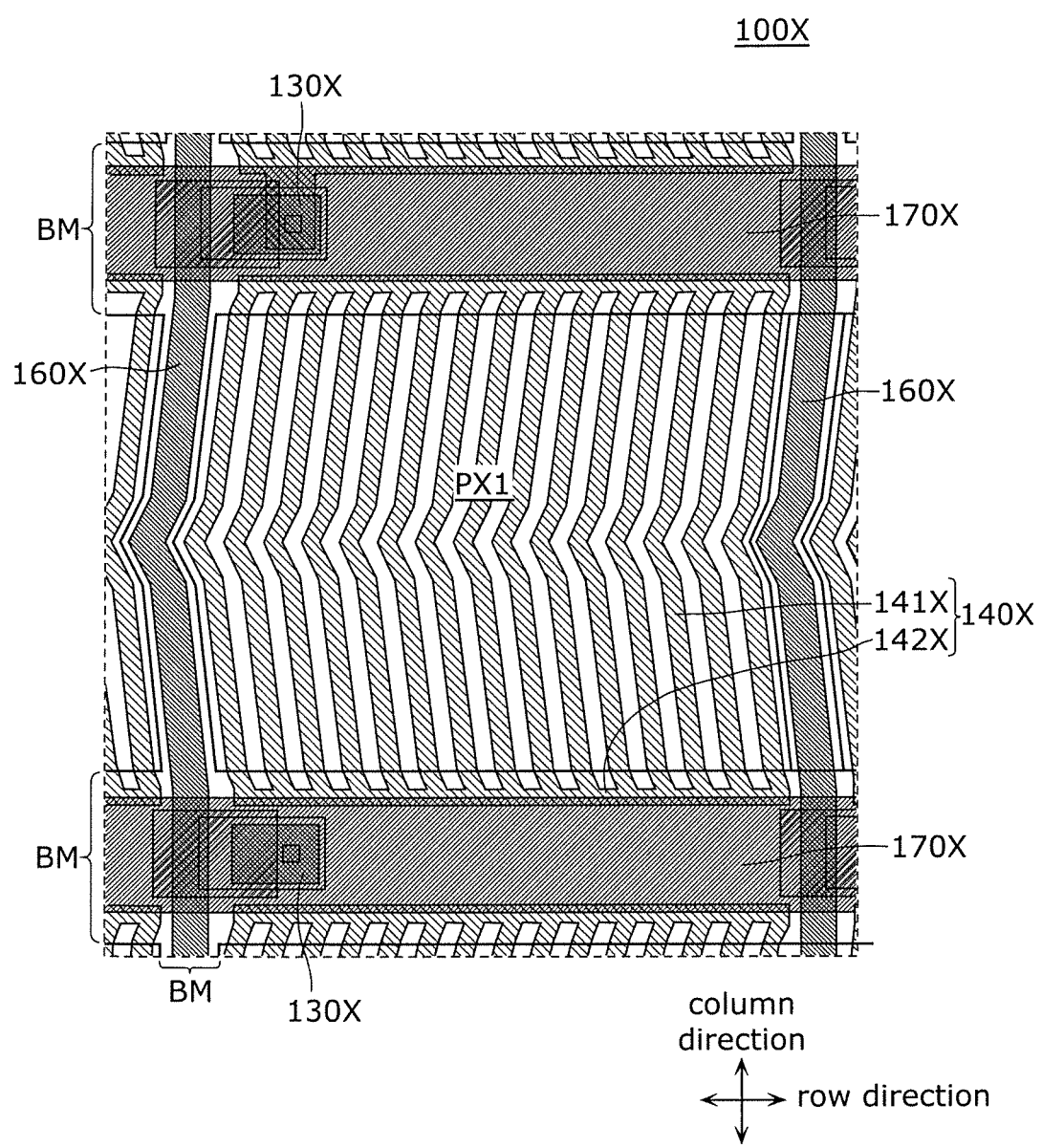
FIG. 7 is a plan view illustrating a layout of pixels of first liquid crystal display panel in a liquid crystal display device according to a comparative example.
Figure 8:
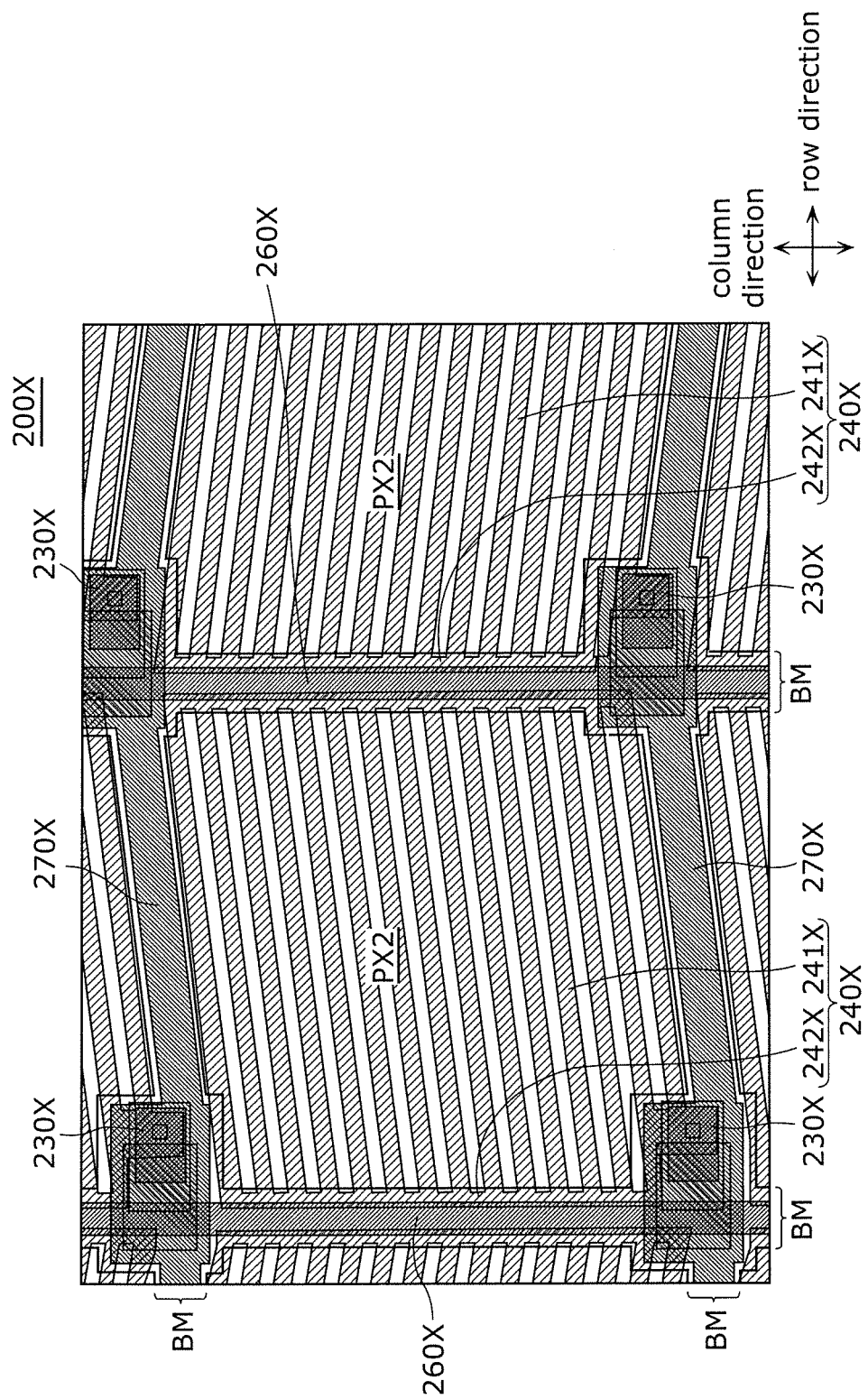
FIG. 8 is a plan view illustrating a layout of pixels of second liquid crystal display panel in the liquid crystal display device of the comparative example.

Effects of liquid crystal display device 1 of the first exemplary embodiment, including circumstances leading to the technique of the present disclosure, will be described below with reference to FIGS. 7 and 8. FIG. 7 is a plan view illustrating a layout of pixels PX1 of first liquid crystal display panel 100X in a liquid crystal display device according to a comparative example. FIG. 8 is a plan view illustrating a layout of pixels PX2 of second liquid crystal display panel 200X in the liquid crystal display device of the comparative example.

The liquid crystal display device of the comparative example includes first liquid crystal display panel 100X having the configuration in FIG. 7 and second liquid crystal display panel 200X having the configuration in FIG. 8.

As illustrated in FIGS. 7 and 8, the liquid crystal driving system of first liquid crystal display panel 100X and second liquid crystal display panel 200X is the transverse electric field system.

Specifically, first liquid crystal display panel 100X is the same as first liquid crystal display panel 100 of the first exemplary embodiment. Thus, the layout of pixels PX1 of first liquid crystal display panel 100X in FIG. 7 is the same as the layout of pixels PX1 of first liquid crystal display panel 100 in FIG. 4.

For example, as illustrated in FIG. 7, in first liquid crystal display panel 100X, each of a plurality of video signal lines 160X extending in the column direction is partially bent into the chevron shape in each pixel PX1. A plurality of scanning lines 170X extending in the row direction each have the linear shape, and are formed so as to be parallel to each other. Transistors 130X formed at the intersections of video signal lines 160X and scanning lines 170X are arrayed in a straight line along the row direction and the column direction.

In first liquid crystal display panel 100X of FIG. 7, in each pixel PX1, pixel electrode 140X includes a plurality of line electrodes 141X that are formed in the chevron shape and extend in the column direction and coupling electrodes 142X extending in the row direction.

On the other hand, as illustrated in FIG. 8, in second liquid crystal display panel 200X, a plurality of video signal lines 260X extending in the column direction each have the linear shape, and are formed so as to be parallel to each other. A plurality of scanning lines 270X extending in the row direction each have the linear shape in each pixel PX2, but have a bending portion over two adjacent pixels PX2. That is, scanning line 270X is bent at the intersection between video signal line 260X and scanning line 270X. For this reason, transistors 230X formed at the intersections of video signal lines 260X and scanning lines 270X are arrayed in a straight line in the column direction, but arrayed in a zigzag shape in the row direction.

In second liquid crystal display panel 200X of FIG. 8, in each pixel PX2, pixel electrode 240X includes a plurality of linear line electrodes 241X extending obliquely in the row direction and coupling electrodes 242X extending in the column direction. Similarly to scanning line 270X, pixel electrodes 240X over two adjacent pixels PX2 are configured to have one bending portion, and an inclination direction of line electrode 241X of pixel electrode 240X in one of two adjacent pixels PX2 is different from an inclination direction of line electrode 241X of pixel electrode 240X in the other pixel PX2.

In this way, in first liquid crystal display panel 100X and second liquid crystal display panel 200X, video signal lines 160X and 260X are different from each other in the shape, scanning lines 170X and 270X are different from each other in the shape, pixel electrodes 140X and 240X are different from each other in the shape, and semiconductor layers of transistors 130X and 230X are different from each other in the shape. First liquid crystal display panel 100X and second liquid crystal display panel 200X are different from each other in not only the shapes but also orientations of line electrodes 141X and 241X of pixel electrodes 140X and 240X.

As described above, when manufacturing first liquid crystal display panel 100X and second liquid crystal display panel 200X having different shapes of various electrodes and/or various wirings, twice as many masks as the single liquid crystal display panel are required in order to pattern the various electrodes and/or the various wirings into a predetermined shape in first liquid crystal display panel 100X and second liquid crystal display panel 200X. That is, different masks are required for each of the various electrodes and/or the various wirings in first liquid crystal display panel 100X and second liquid crystal display panel 200X.

On the other hand, in liquid crystal display device 1 of the first exemplary embodiment, at least one of video signal lines 160 and 260, scanning lines 170 and 270, semiconductor layer 134 of transistor 130 and semiconductor layer 234 of transistor 230, pixel electrodes 140 and 240, common electrodes 150 and 250, the common lines, the spacers, and the black matrices is patterned in the same shape in first liquid crystal display panel 100 and second liquid crystal display panel 200.

As described above, according to a method for manufacturing liquid crystal display device 1 of the first exemplary embodiment, at least one of video signal lines 160 and 260, scanning lines 170 and 270, semiconductor layer 134 of transistor 130 and semiconductor layer 234 of transistor 230, pixel electrodes 140 and 240, common electrodes 150 and 250, the common lines, the spacers, and the black matrices is patterned using the same mask in first liquid crystal display panel 100 and second liquid crystal display panel 200.

Thus, in liquid crystal display device 1 of the first exemplary embodiment, at least one of the various electrodes and/or various wirings has the same shape, and at least one of the various electrodes and/or various wirings is patterned using the same mask. That is, first liquid crystal display panel 100 and second liquid crystal display panel 200 share the mask for at least one of the various electrodes and/or various wirings. Consequently, even if first liquid crystal display panel 100 and second liquid crystal display panel 200 having different shapes of the various electrodes and/or the various wirings are used, twice as many masks as the single liquid crystal display panel are not required.

Specifically, in liquid crystal display device 1 of the first exemplary embodiment, each of semiconductor layer 134 of transistor 130 and semiconductor layer 234 of transistor 230, common electrodes 150 and 250, and spacers is patterned in the same shape in first liquid crystal display panel 100 and second liquid crystal display panel 200. In this case, in the method for manufacturing liquid crystal display device 1 of the first exemplary embodiment, each of semiconductor layer 134 of transistor 130 and semiconductor layer 234 of transistor 230, common electrodes 150 and 250, and spacers is patterned using the same shape in first liquid crystal display panel 100 and second liquid crystal display panel 200.

That is, semiconductor layer 134 of first liquid crystal display panel 100 and semiconductor layer 234 of second liquid crystal display panel 200 are patterned using the same mask so as to have the same shape. Similarly, common electrode 150 of first liquid crystal display panel 100 and common electrode 250 of second liquid crystal display panel 200 are patterned using the same mask so as to have the same shape. The spacer of first liquid crystal display panel 100 and the spacer of second liquid crystal display panel 200 are patterned using the same mask so as to have the same shape.

Thus, in liquid crystal display device 1 of the first exemplary embodiment, three masks can be shared by the semiconductor layers of the transistors, the common electrodes, and the spacers. Consequently, cost reduction can be achieved.

In liquid crystal display device 1 of the first exemplary embodiment, when one or a plurality of types of contact holes piercing at least one of first insulating film 191, second insulating film 192, third insulating film 193, and fourth insulating film 194 are made, the patterning is performed using the same mask in first liquid crystal display panel 100 and second liquid crystal display panel 200. Consequently, the cost can further be reduced.

In the first exemplary embodiment, that the same mask is used in first liquid crystal display panel 100 and second liquid crystal display panel 200 means the use of the physically same mask, and the use of masks that are physically different but have the same shape. In this case, the use of the physically same mask for first liquid crystal display panel 100 and second liquid crystal display panel 200 as in the former can significantly reduce the cost as compared with the latter. However, even if the physically different masks are used for first liquid crystal display panel 100 and second liquid crystal display panel 200, the cost of mask design and the like can be reduced. The meaning of the use of the same mask also holds true for the second exemplary embodiment.

Second Exemplary Embodiment

Figure 9:
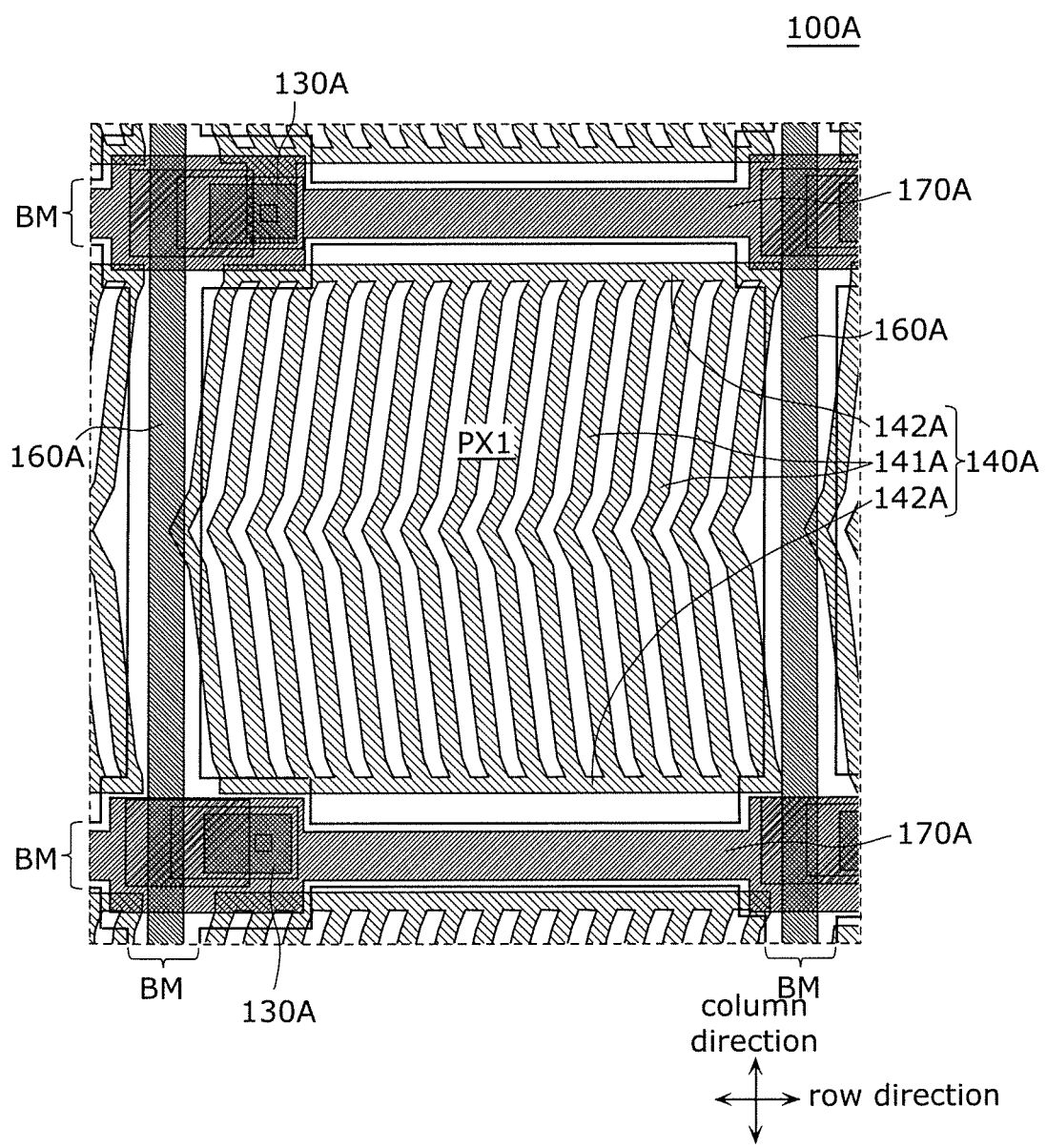
FIG. 9 is a plan view illustrating the layout of pixels of first liquid crystal display panel in liquid crystal display device according to the second exemplary embodiment.
Figure 10:
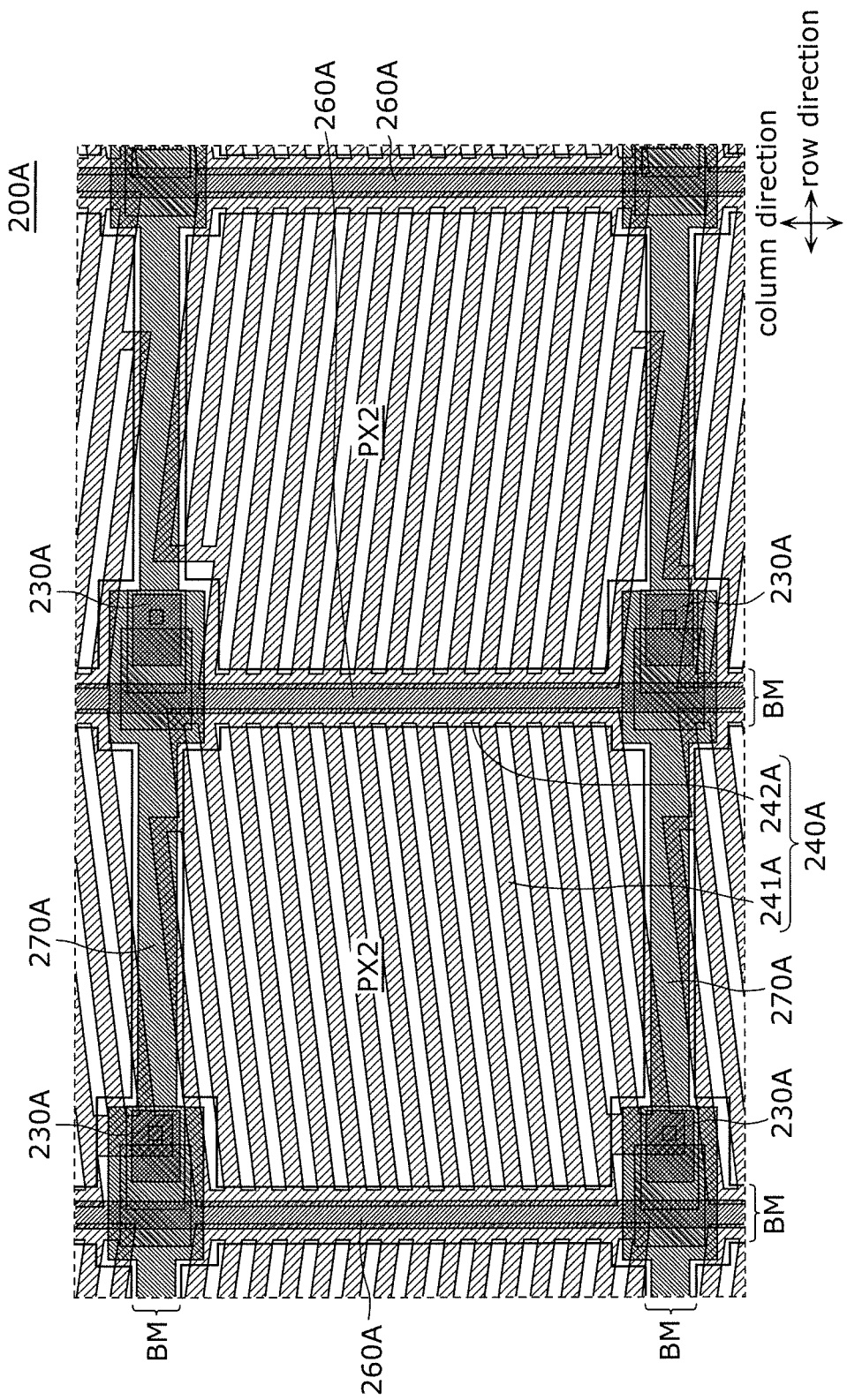
FIG. 10 is a plan view illustrating the layout of pixels of second liquid crystal display panel in liquid crystal display device according to the second exemplary embodiment.

Liquid crystal display device 1A according to a second exemplary embodiment will be described below with reference to FIGS. 9 and 10. FIG. 9 is a plan view illustrating the layout of pixels PX1 of first liquid crystal display panel 100A in liquid crystal display device 1A of the second exemplary embodiment. FIG. 10 is a plan view illustrating the layout of pixels PX2 of second liquid crystal display panel 200A in liquid crystal display device 1A of the second exemplary embodiment.

Liquid crystal display device 1A of the second exemplary embodiment includes first liquid crystal display panel 100A having the configuration in FIG. 9 and second liquid crystal display panel 200A having the configuration in FIG. 10.

First liquid crystal display panel 100A and second liquid crystal display panel 200A used in liquid crystal display device 1A of the second exemplary embodiment include the same constituent members as first liquid crystal display panel 100 and second liquid crystal display panel 200 used in liquid crystal display device 1 of the first exemplary embodiment. For example, first liquid crystal display panel 100A and second liquid crystal display panel 200A include various electrodes and various wirings such as the video signal lines, the scanning lines, the transistors, the pixel electrodes, the common electrodes, the common lines, the spacers, and the black matrices.

Liquid crystal display device 1A of the second exemplary embodiment and liquid crystal display device 1 of the first exemplary embodiment differ from each other in the shapes of the various electrodes and the various wirings in first liquid crystal display panel 100A and second liquid crystal display panel 200A.

Specifically, in first liquid crystal display panel 100A of FIG. 9, each of a plurality of video signal lines 160A is different from video signal line 160 of the first exemplary embodiment, and the plurality of video signal lines 160A each have the linear shape, and extend along the column direction so as to be parallel to each other. Similarly to scanning lines 170 of the first exemplary embodiment, a plurality of scanning lines 170A each have the linear shape and extend along the row direction so as to be parallel to each other. Unlike scanning line 170 of the first exemplary embodiment, the width varies partially except at the intersection of video signal line 160A and scanning line 170A.

Video signal line 160A and scanning line 170A are covered with black matrix BM. That is, the upper portions of video signal line 160A and scanning line 170A constitute a non-opening. Black matrix BM is formed along the shapes of video signal line 160A and scanning line 170A.

In first liquid crystal display panel 100A of FIG. 9, in each pixel PX1, similarly to pixel electrode 140 of the first exemplary embodiment, pixel electrode 140A includes a plurality of line electrodes 141A that extend in the column direction and are formed in the chevron shape and coupling electrodes 142A extending in the row direction.

Transistors 130A formed at the intersections of video signal line 160A and scanning lines 170A have the same shape, and are arrayed in the straight line along each of the row direction and the column direction.

The sectional structure of first liquid crystal display panel 100A is the same as the sectional structure of first liquid crystal display panel 100 of the first exemplary embodiment, and the description will be omitted.

On the other hand, in second liquid crystal display panel 200A of FIG. 10, similarly to video signal lines 260 of the first exemplary embodiment, video signal lines 260A each have the linear shape and extend in the column direction so as to be parallel to each other. Similarly to scanning lines 270 of the first exemplary embodiment, a plurality of scanning lines 270A each have the linear shape and extend along the row direction so as to be parallel to each other. Unlike scanning line 270 of the first exemplary embodiment, the width varies partially except at the intersection of video signal line 260A and scanning line 270A.

Video signal line 260A and scanning line 270A are covered with black matrix BM. That is, the upper portions of video signal line 260A and scanning line 270A constitute a non-opening. Black matrix BM is formed along the shapes of video signal line 260A and scanning line 270A.

In second liquid crystal display panel 200A of FIG. 10, in each pixel PX2, pixel electrode 240A includes a plurality of linear line electrodes 241A extending obliquely in the row direction and coupling electrodes 242A extending in the column direction. Pixel electrodes 240A are configured to have one bending portion over two adjacent pixels PX2, and an inclination direction of line electrode 241A of pixel electrode 240A in one of two adjacent pixels PX2 is different from an inclination direction of line electrode 241A of pixel electrode 240A in the other pixel PX2.

Transistors 230A formed at the intersections of video signal line 260A and scanning lines 270A have the same shape, and are arrayed in the straight line along each of the row direction and the column direction.

The sectional structure of second liquid crystal display panel 200A is the same as the sectional structure of second liquid crystal display panel 200 of the first exemplary embodiment, and the description will be omitted.

As described above, in liquid crystal display device 1A of the second exemplary embodiment, at least one of video signal lines 160A and 260A, scanning lines 170A and 270A, the semiconductor layers of transistor 130A and 230A, pixel electrode 140A and 240A, the common electrodes, the common lines, the spacers, and the black matrices has the same shape in first liquid crystal display panel 100A and second liquid crystal display panel 200A, and is patterned using the same mask.

Thus, even in liquid crystal display device 1A of the second exemplary embodiment, similarly to liquid crystal display device 1 of the first exemplary embodiment, at least one of various electrodes and/or various wirings is patterned using the same mask. Consequently, even if first liquid crystal display panel 100A and second liquid crystal display panel 200A having different shapes of the various electrodes and/or the various wirings are used, twice as many masks as the single liquid crystal display panel are not required.

Specifically, in liquid crystal display device 1 of the first exemplary embodiment, each of semiconductor layer 134 of transistor 130 and semiconductor layer 234 of transistor 230, common electrodes 150 and 250, and the spacers is patterned in the same shape in first liquid crystal display panel 100 and second liquid crystal display panel 200. On the other hand, in liquid crystal display device 1A of the second exemplary embodiment, each of video signal lines 160A and 260A, scanning lines 170A and 270A, the semiconductor layers of transistors 130A and 230A, the common electrodes, the common lines, the spacers, and the black matrices is patterned in the same shape in first liquid crystal display panel 100A and second liquid crystal display panel 200A.

In this case, according to a method of manufacturing liquid crystal display device 1A of the second exemplary embodiment, each of video signal lines 160A and 260A, scanning lines 170A and 270A, the semiconductor layers of transistors 130A and 230A, the common electrodes, the common lines, the spacers, and the black matrices is patterned using the same mask in first liquid crystal display panel 100A and second liquid crystal display panel 200A.

Specifically, in liquid crystal display device 1A of the second exemplary embodiment, members except for the pixel electrode among all the members to be patterned are patterned in the same shape in first liquid crystal display panel 100A and second liquid crystal display panel 200A. That is, the members except for the pixel electrode among all the members to be patterned are patterned using the same mask in first liquid crystal display panel 100A and second liquid crystal display panel 200A.

Thus, in liquid crystal display device 1A of the second exemplary embodiment, the significant cost reduction can be achieved as compared with liquid crystal display device 1 of the first exemplary embodiment.

(Modifications)

The liquid crystal display device of the present disclosure has been described above based on the first and second exemplary embodiments. However, the present disclosure is not limited to the first and second exemplary embodiments.

For example, in the first and second exemplary embodiments, liquid crystal display devices 1 and 1A are configured by the two of first liquid crystal display panels 100 and 100A and second liquid crystal display panels 200 and 200A. However, the present disclosure is not limited to this configuration. That is, the number of liquid crystal display panels in the liquid crystal display device is not limited, but may be three or more.

In the first and second exemplary embodiments, first liquid crystal display panels 100 and 100A display the color image and second liquid crystal display panels 200 and 200A display the monochrome image. However, the present disclosure is not limited to this configuration. For example, first liquid crystal display panels 100 and 100A may display the monochrome image and second liquid crystal display panels 200 and 200A may display the color image.

In the first and second exemplary embodiments, video signal lines 160 and 260 are connected to drain electrodes 133 and 233 of transistors 130 and 230, and pixel electrodes 140 and 240 are connected to source electrodes 132 and 232 of transistors 130 and 230. However, the present disclosure is not limited to this configuration. For example, video signal lines 160 and 260 may be connected to source electrodes 132 and 232 of transistors 130 and 230, and pixel electrodes 140 and 240 may be connected to drain electrodes 133 and 233 of transistors 130 and 230.

In the first and second exemplary embodiments, backlight 300 is a direct-type LED backlight in which the plurality of LEDs are arranged in a matrix form. However, the present disclosure is not limited to this configuration. For example, the backlight may be an edge-type backlight including a light guide plate, a light source (LED or cold cathode tube) disposed on a side surface at an end of the light guide plate, and a reflector disposed on a back surface of the light guide plate.

An embodiment obtained by making various modifications on the first and second exemplary embodiments by those skilled in the art and an embodiment implemented by appropriately combining the constituent elements and functions in the first and second exemplary embodiments without departing from the scope of the present disclosure are also included in the present disclosure.

What is claimed is:

1. A method for manufacturing a liquid crystal display device including a first liquid crystal display panel and a second liquid crystal display panel opposed to the first liquid crystal display panel, wherein
    each of the first liquid crystal display panel and the second liquid crystal display panel includes a video signal line, a scanning line, a transistor provided in each pixel, a pixel electrode provided in each pixel, a common electrode opposed to the pixel electrode, a liquid crystal layer, and a spacer maintaining a gap in which the liquid crystal layer is disposed, and
    each of a semiconductor layer of the transistor, the common electrode, and the spacer is patterned using an identical mask in the first liquid crystal display panel and the second liquid crystal display panel.

2. The liquid crystal display device manufacturing method according to claim 1, wherein
    the common electrode is provided over a plurality of pixels,
    each of the first liquid crystal display panel and the second liquid crystal display panel further includes a common line laminated on the common electrode, and
    each of the semiconductor layer of the transistor, the common electrode, and the spacer, and at least one of the video signal line, the scanning line, the pixel electrode, and the common line is patterned using an identical mask in the first liquid crystal display panel and the second liquid crystal display panel.

3. The liquid crystal display device manufacturing method according to claim 2, wherein
    each of the first liquid crystal display panel and the second liquid crystal display panel includes a black matrix provided at a boundary between adjacent pixels, and
    each of the semiconductor layer of the transistor, the common electrode, and the spacer, and at least one of the video signal line, the scanning line, the pixel electrode, the common line, and the black matrix is patterned using an identical mask in the first liquid crystal display panel and the second liquid crystal display panel.

4. The liquid crystal display device manufacturing method according to claim 3, wherein each of the video signal line, the scanning line, the semiconductor layer of the transistor, the common electrode, the common line, the spacer, and the black matrix is patterned using an identical mask in the first liquid crystal display panel and the second liquid crystal display panel.

5. The liquid crystal display device manufacturing method according to claim 4, wherein
    the pixel electrode of the first liquid crystal display panel and the pixel electrode of the second liquid crystal display panel each have a plurality of stripe-shaped line electrodes, and
    an extending direction of the line electrode in the first liquid crystal display panel is different from an extending direction of the line electrode in the second liquid crystal display panel.

6. A method for manufacturing a liquid crystal display device including a first liquid crystal display panel and a second liquid crystal display panel opposed to the first liquid crystal display panel, wherein
    each of the first liquid crystal display panel and the second liquid crystal display panel includes a video signal line, a scanning line, a transistor provided in each pixel, and a pixel electrode provided in each pixel,
    at least one of the video signal line, the scanning line, a semiconductor layer of the transistor, and the pixel electrode is patterned using an identical mask in the first liquid crystal display panel and the second liquid crystal display panel, and
    members except for the pixel electrode among all members to be patterned are patterned using an identical mask in the first liquid crystal display panel and the second liquid crystal display panel.

* * * * *